Patented Nov. 5, 1946

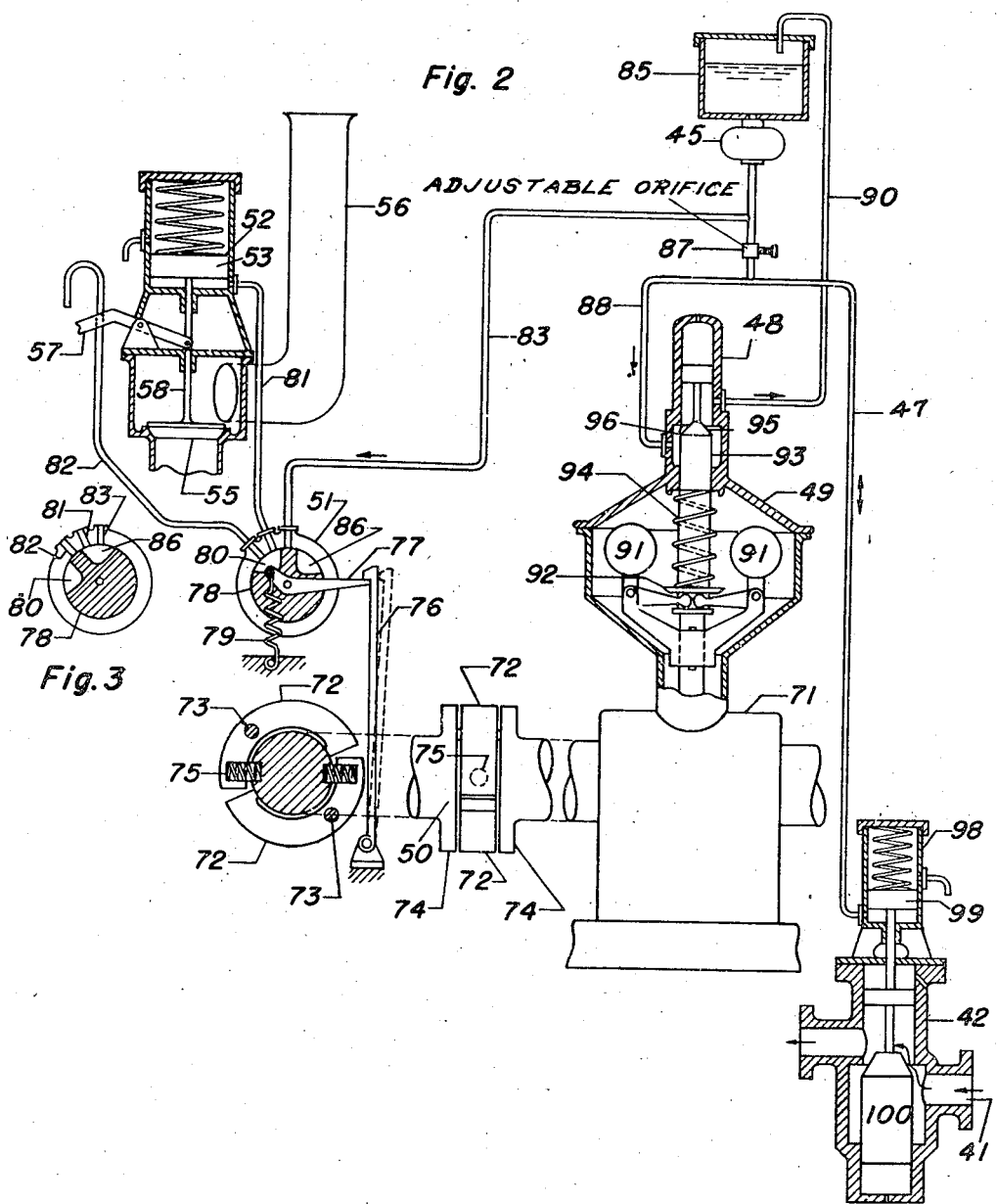

2,410,457

UNITED STATES PATENT OFFICE 2,410,457

OPERATION AND REGULATION OF COMBUSTION TURBINES

Friedrich Nettel, Tokyo, Japan; vested in the Alien Property Custodian

Application April 20, 1940, Serial No. 330,801

14 Claims. (Cl. 60—59)

This invention relates to a combustion turbine of the type known as a gas turbine and more particularly to a method of operating and controlling the same.

It is an object of the present invention to apply to closed cycle combustion turbine plants artificial refrigeration of the gas used to drive the turbine, herein called the working gas, before compression and to produce the refrigeration at least in part by the rejected heat from the turbine.

Another object is to effect speed regulation of the turbine under fluctuations of load by changing the degree of refrigeration of the working gas in closed cycles and of the combustion air, i. e., the working gas, in open cycles.

Another object is to store what may be termed, for want of a better expression, refrigeration energy during periods when this is available in excess and to use it during times when excess loads are imposed on the system.

A still further object of the invention, when applied to turbine plants working on a closed cycle, is to change the closed cycle into an open cycle in case of sudden large decreases of the load and to protect the means for heating the working gas against overheating and damage under such conditions.

The subject matter of this application has many features in common with that in my Patent No. 2,322,717, issued June 22, 1943.

Fig. 2 is an enlarged detail view showing certain control devices; and

Fig. 3 is a detail view showing one position of a valve in the control mechanism.

Figure 1:
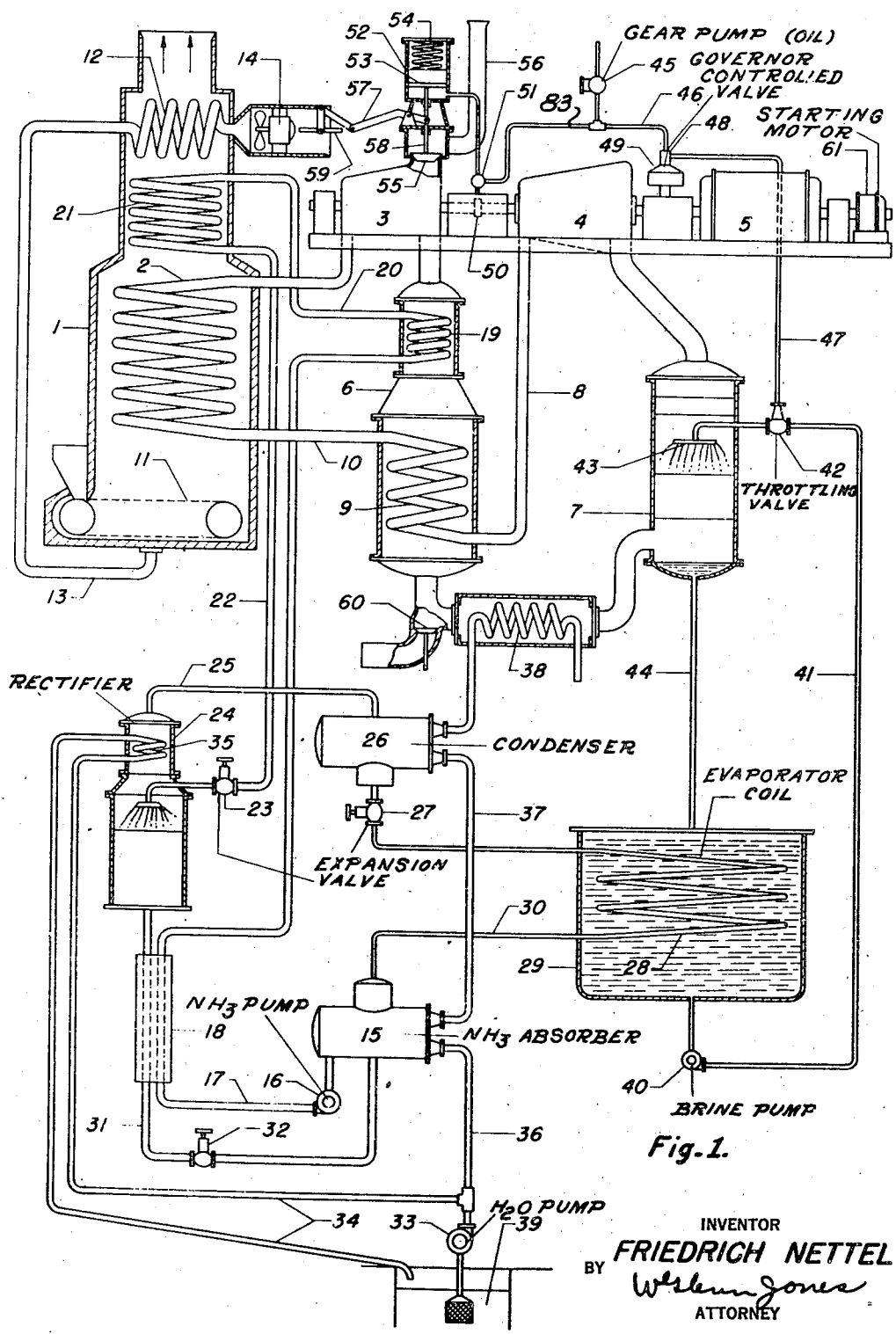
Fig. 1 is a schematic layout of a system illustrating my invention.

Closed cycle operation of gas turbines, as practiced heretofore, wherein the compressed working gas is heated in part by the rejected heat from the turbine, and the cooling of the working gas prior to or during compression by water or air, effects only a very small improvement in the efficiency of the system. The permissible compression ratio must be restricted to rather low values in open or closed cycles using only water or air cooled heat exchangers for the combustion air or the working gas, respectively, and thus the overall efficiency obtainable is comparatively low.

Particularly in closed cycle operation the efficiency is kept down by the necessity of holding the temperature in the external combustion chamber to a high value in view of the desired high inlet temperature of the working gas into the turbine. These gases leave the combustion chamber and may be used to preheat the combustion air before they escape through the stack. Preheating of the combustion air cannot, however, be driven too high because this may lead to excessively high combustion temperatures and is not permissible when traveling grates or the like are used, due to resulting damage to the grates. Thus, large heat losses in the combustion gases are unavoidable.

The heat losses mentioned are avoided or very much reduced if, according to the present invention, the heat carried by the gases leaving the external combustion chamber is used to operate an absorption type refrigeration system. I interpose in the flow of combustion gases to the stack a device to absorb heat from the said gases to heat strong ammonia liquor. This heater has a function similar to that of an economizer in a steam boiler and the combustion air may likewise be heated by the gases passing to the stack. By this means the heat efficiency of the external combustion device can be brought up to the values obtained with the best steam boilers.

It is necessary that the speed of the turbine be closely regulated under changing load, particularly when the turbine drives an alternator whereof the frequency must be kept constant within close limits. However, this regulation is difficult with any prior art devices known to me. Regulation of fuel feed does not always function with sufficient rapidity on account of the large quantity of heat stored in the walls of the combustion chamber. Bypass valves to the turbine are constantly exposed to very high temperatures and therefore are difficult to keep tight. Changing the density of the working gas in closed cycles is complicated and wasteful.

In case the load is suddenly removed, as may result from the tripping of the circuit breaker of a driven alternator, I permit most of the working gas to escape from the closed cycle. Even though the fuel supply and the inlet of combustion air to the combustion chamber are stopped simultaneously with the flow of the working gas to the turbine, the heater coils for the working gas inside the combustion chamber nevertheless remain exposed to the radiation of the hot walls of the combustion chamber without being cooled by the flow of gas therethrough. This, especially in the case of grate firing, leads to dangerous overheating of the coils and may so damage them as to require replacement.

This damage to the heater coils is avoided under such conditions by continuing the circulation of gas through the coils while the low pressure side of the turbine is open to the atmosphere and the intake to the compressor is likewise open to the atmosphere so that air is circulated through the heater coils for a sufficient time to prevent damage. That is, the closed cycle is temporarily changed to an open cycle. When it appears desirable to prolong the cooling period of the heating coils it may be done by keeping the compressor in rotation by means of an external power source, such as the starting motor coupled to the compressor.

The regulation of speed under smaller load changes is effected, according to my invention, for both open and closed cycles by changing the intensity of refrigeration of the working gas. When the load decreases refrigeration is reduced and when it rises refrigeration is intensified. The possibility of speed regulation by this method becomes clear if we consider the fact that reduction of refrigeration increases the power consumed by the compressor and vice versa or for the same power consumption it varies the mass of working gas supplied. The power remaining for driving the alternator, representing the difference between gross turbine power and power consumption for the compressor, is thus altered and gives effective speed regulation.

It is true that by reducing the refrigeration to regulate the speed the thermal efficiency is somewhat diminished. The actual heat loss, however, is small because the increase in waste heat causes more heat to be absorbed in the refrigeration circuit where it is converted into refrigeration energy that may be stored in the form of cold brine or liquid ammonia.

In many plants the turbines have to work for long periods at low loads followed by peak loads of shorter duration. At low load the efficiencies are less and therefore a surplus of refrigeration energy is produced which is stored as above mentioned. During peak load the volume of brine flow to cool the working gas is increased and thus a large overload of the alternator may be carried.

By combining, according to the present invention, the different correlated measures referred to above either severally or collectively, results are obtained which, as regards conversion of heat into mechanical energy and the safe and economical operation of the plant, have never before been attained.

Referring now to the drawings, I show a combustion device 1 wherein is disposed a coil 2 for heating the working gas, said coil being connected to the inlet or high pressure side of a gas turbine 3 drivingly connected to a compressor 4 and a load 5 that is for purpose of illustration shown as an electric generator. The exhaust gas from the low pressure side of turbine 3 is drawn through a heat exchanger 6 and a refrigerating device 7, presently to be described, to the intake of compressor 4 from which it is discharged, after compression, through a pipe 8 to a coil 9 in heat exchanger 6 where the compressed air is somewhat heated by the rejected heat from turbine 3 and thence through pipe 10 to coil 2. The combustion device 1 is shown as being fired by a traveling grate 11, although any other type of fuel burning means may be used, the air to support combustion being preheated in a coil 12 disposed in the stack gases and conveyed to the zone of combustion through a pipe 13. Forced flow of the combustion air may be obtained by any known means such as the blower or fan 14.

The refrigeration system includes an ammonia absorber 15 from which the strong ammonia liquor is circulated by pump 16 through pipe 17 that passes through heat exchanger 18 to a generator coil 19 disposed in heat exchanger 6 and thence through pipe 20 to generator coil 21 disposed in the path of the stack gases of combustion device 1. From generator coil 21 the highly heated ammonia liquor passes through pipe 22 and expansion valve 23 to rectifier 24 where the ammonia vapor is separated from the water. From rectifier 24 the ammonia gas passes through pipe 25 to condenser 26 and thence through expansion valve 27 to the evaporator coil 28 in brine tank 29 and back through pipe 30 to absorber 15.

The weak ammonia liquor is carried from rectifier 24 by pipe 31 through heat exchanger 18 and valve 32 back to absorber 15.

Cooling water from a source 39, which may be a lake, a river, or the sea, is circulated by pump 33 through pipes 34 to coil 35 in rectifier 24 and also through pipes 36 and 37, through the absorber 15 and the condenser 26. The cooling water in this circuit passes from condenser 26 through a coil 38 in the path of working gas moving to the inlet of compressor 4 and thence to discharge.

Cold brine from tank 29 is forced by pump 40 through pipe 41 and throttling valve 42 to a spray head 43 in the member 7 where all the air passing to the inlet of compressor 4 must pass through the spray of cold brine. Return of the brine to tank 29 is through pipe 44.

Throttling valve 42 is adjusted initially to give the desired refrigeration effect for the proper working speed of turbine 3. Gear pump 45 is connected to supply oil under pressure to pipes 46 and 47. Flow of oil from gear pump 45 to pipe 47 and thence to throttling valve 42 is regulated by a valve 48 controlled by a centrifugal governor 49 connected to the shaft between compressor 4 and generator 5. When the speed of turbine 3 increases the governor 49 operates valve 48 to apply oil pressure through pipe 47 to throttling valve 42 to reduce the flow of brine to spray head 43. This diminishes the degree of cooling of the gas that is taken into compressor 4 and thus increases the load imposed on turbine 3 by compressor 4 and so reduces the speed of the turbine. On the other hand, if the speed of turbine 3 drops, the change in oil pressure on valve 42 opens the valve and causes greater cooling of the working gas moving into compressor 4 and thus speeds up the turbine 3.

In the event of a sudden large drop in the load turbine 3 would speed up very quickly. When this happens an emergency governor or automatic stop 50, of a type well known in the steam turbine art, connected to the shaft between turbine 3 and compressor 4, operates a valve 51 to permit oil under pressure to flow from gear pump 45 to the cylinder 52 of a hydraulic servo motor to move piston 53 against the pressure of spring 54 to open a valve 55 that connects the low pressure side of turbine 3 with the atmosphere through a pipe 56.

Simultaneously, through a linkage, designated as 57, that is connected to stem 58 of valve 55 and also to an air control damper 59, the supply of combustion air is reduced or cut off. Since the exhaust gases from turbine 3 will then not be circulated down through heat exchanger 6 and since compressor 4 will still be exerting suction at its intake, the check valve 60 will be unseated and the intake of compressor 4 will be effectively opened to the atmosphere. Thus the air through pipe 8 will not be heated in coil 9 and will effectively cool the coil 2 to prevent damage to the coil by radiation of heat from the walls of combustion device 1. If it seems desirable to prolong the circulation of air through coil 2 the motor 61 that is provided for initially starting the compressor 4 may be utilized to keep the compressor 4 operating and maintain the circulation of air through coil 2.

The several control devices above-mentioned will now be described in detail with particular reference to Fig. 2.

Emergency governor 50, which is mounted on main shaft 71, comprises two arcuate weight members 72 eccentrically pivoted at 73 between flanges 74 and loaded by springs 75 to remain inoperative until a predetermined speed of rotation of shaft 71 is attained. When such speed is reached, the weights 72 are thrown outwardly to contact lever 76 and disengage lever 76 from one end of lever 77 which is pivoted intermediate its ends to valve member 78 and is loaded at its other end by spring 79 to tend to rotate valve member 78 counterclockwise as seen in the drawings.

When shaft 71 is rotating at speeds less than the desired maximum and levers 76 and 77 are engaged, cut-out portion 80 in valve member 78 vents pipe 81 that carries pressure fluid to the space under piston 53 to a drain pipe 82, while pressure line 83 to gear pump 45 and fluid supply 85 is closed off. The drain pipe 82 is formed with a bight to prevent all oil from draining out from under the piston 53. If such evacuation of this space did occur, it would delay the action of the control until the space was again filled. However, when levers 76 and 77 are disengaged as a result of excessive speed of shaft 71 and valve member 78 is rotated counterclockwise by spring 79, pipe 82 is shut off and pipe 81 is connected to pressure line 83 through cut-out portion 86, as shown in Fig. 3. Fluid from gear pump 45 then lifts piston 53, opening valve 55 to permit combustion motor 3 to exhaust to atmosphere by way of conduit 56 and operating lever 57 to choke the air intake to the combustion device 1. When the abnormal conditions have been corrected, levers 77 and 76 are re-engaged manually.

At normal operating speeds, fluid from pump 45 passes through adjustable orifice member 87 and pipe 88 to valve 48 whence it is by-passed to tank 85 through pipe 90. However, as the speed of shaft 71 approaches an excessive value, governor balls 91 act upon collar 92 to push up plunger 93 against the action of spring 94, bringing tapered surface 95 nearer orifice 96 and throttling flow of fluid back to tank 85 through pipe 90. As soon as the throttling action begins, pressure builds up in the fluid in pipe 47 leading to the space in cylinder 98 under piston 99, actuating the plunger 100 in throttling valve 42 to diminish the flow of cold brine to air cooler 7, which lowers the degree of refrigeration of combustion air before compression and so consumes more power for compressing the air and curtails the volume of air, thus reducing the speed of shaft 71.

Speed responsive control mechanism similar to that above described is shown on page 31, Naval Engineering Review, January 1933, vol. XXIII No. 93, and also on pages 31, 32, and 49 of Regelung und Ausgleich in Dampfanlagen by Th. Stein, editor, Jul. Springer, Berlin 1926.

I claim:

1. A power system, comprising a gas turbine having inlet and outlet ports, means to supply working gas in a closed cycle to operate said turbine including a compressor connected to be driven by said turbine, said compressor having inlet and outlet ports, means connecting the outlet port of said turbine to the inlet port of said compressor, a combustion device, means connecting the outlet of said compressor to the inlet of said turbine including a surface heater disposed to absorb heat from the exhaust gases of said turbine and a surface heater disposed to be heated by said combustion device to heat said working gas; an absorption refrigeration system including a surface heater disposed to be heated by the exhaust gases of said turbine and a surface heater disposed to be heated by said combustion device, an evaporator coil, and a body of liquid to be cooled thereby; means to subject gas moving to the inlet of said compressor to a spray of said cooled liquid to cool said gas, means including a device responsive to the speed of said turbine to control the quantity of said liquid spray in inverse proportion to said speed; means to supply heated air for combustion, an emergency governor responsive to a predetermined excess of speed of said turbine, and means controlled by said emergency governor to reduce said supply of air for combustion and to open the low pressure side of said turbine and the inlet of said compressor to the atmosphere when the speed of said turbine reaches said predetermined excess.

2. A power system, comprising a gas turbine having inlet and outlet ports, means to supply working gas in a closed cycle to operate said turbine including a compressor connected to be driven by said turbine, said compressor having inlet and outlet ports, means connecting the outlet port of said turbine to the inlet port of said compressor, a combustion device, means connecting the outlet of said compressor to the inlet of said turbine including means disposed to absorb heat from the exhaust gases of said turbine and means in series therewith to absorb heat from said combustion device to heat said working gas; an absorption refrigeration system including generator means disposed to be heated by the exhaust gases of said turbine and other generator means in series therewith disposed to be heated by said combustion device, an evaporator coil, and a body of liquid to be cooled thereby; means to subject gas moving to the inlet of said compressor to a spray of said cooled liquid to cool said gas, means including a device responsive to the speed of said turbine to control the quantity of said liquid spray in inverse proportion to said speed; means to supply heated air for combustion, an emergency governor responsive to a predetermined excess of speed of said turbine, and means controlled by said emergency governor to reduce said supply of air for combustion and to open the low pressure side of said turbine and the inlet of said compressor to the atmosphere when the speed of said turbine reaches said predetermined excess.

3. A power system, comprising a gas turbine having inlet and outlet ports, means to supply working gas in a closed cycle to operate said turbine including a compressor connected to be driven by said turbine, said compressor having inlet and outlet ports, means connecting the outlet port of said turbine to the inlet port of said compressor, a combustion device, means connecting the outlet of said compressor to the inlet of said turbine including means disposed to absorb heat from the exhaust gases of said turbine and means in series therewith to absorb heat from said combustion device to heat said working gas; an absorption refrigeration system including means to absorb heat released in said combustion device, evaporator means and a body of liquid to be cooled thereby; means to circulate said cooled liquid in heat exchanging relation with the gas moving to the inlet of said compressor to cool said gas, means including a device responsive to the speed of said turbine to control the said circulation of said liquid to regulate the speed of said turbine; a device responsive to a predetermined excess of speed of said turbine and means controlled by said device to open the low pressure side of said turbine and the inlet of said compressor to the atmosphere when the speed of said turbine reaches said predetermined excess.

4. A power system, comprising a gas turbine having inlet and outlet ports, means to supply working gas in a closed cycle to operate said turbine including a compressor connected to be driven by said turbine, said compressor having inlet and outlet ports, means connecting the outlet port of said turbine to the inlet port of said compressor, a combustion device, means connecting the outlet of said compressor to the inlet of said turbine including means disposed to absorb heat from the exhaust gases of said turbine and means in series therewith to absorb heat from said combustion device to heat said working gas; an absorption refrigeration system including means to absorb heat directly from said combustion device, means to absorb rejected heat from said turbine, evaporator means and a body of liquid to be cooled thereby; means to circulate said cooled liquid in heat exchanging relation with the gas moving to the inlet of said compressor to cool said gas, means including a device responsive to the speed of said turbine to control the said circulation of said liquid to regulate the speed of said turbine; a device responsive to a predetermined excess of speed of said turbine and means controlled by said device to open the low pressure side of said turbine and the inlet of said compressor to the atmosphere when the speed of said turbine reaches said predetermined excess.

5. A power system, comprising a gas turbine having inlet and outlet ports, means to supply working gas in a closed cycle to operate said turbine including a compressor connected to be driven by said turbine, said compressor having inlet and outlet ports, means connecting the outlet port of said turbine to the inlet port of said compressor, a combustion device, means connecting the outlet of said compressor to the inlet of said turbine including means disposed to absorb heat from the exhaust gases of said turbine and means in series therewith to absorb heat from said combustion device to heat said working gas; an absorption refrigeration system including means to absorb heat released in said combustion device, evaporator means and a body of liquid to be cooled thereby; means to circulate said cooled liquid in heat exchanging relation with the gas moving to the inlet of said compressor to cool said gas, means including a device responsive to the speed of said turbine to control the said circulation of said liquid to regulate the speed of said turbine; a device responsive to a predetermined excess of speed of said turbine and means controlled by said device to open the low pressure side of said turbine and the inlet of said compressor to the atmosphere and reduce the supply of combustion air to said combustion device when the speed of said turbine reaches said predetermined excess.

6. A power system, comprising a gas turbine, means to compress working gas therefor, means to heat said gas after compression, means operated by heat derived from said heating means to refrigerate said gas before compression, means responsive to the speed of said turbine to increase said refrigeration when the speed of said turbine drops below a predetermined value and to decrease said refrigeration when said speed exceeds said value, a device responsive to a predetermined excess of said speed, and means controlled by said device to reduce the heat supplied to said gas.

7. A power system, comprising a gas turbine, means to compress working gas therefor, means to heat said gas after compression, means to refrigerate said gas before compression, means responsive to the speed of said turbine to increase said refrigeration when the speed of said turbine drops below a predetermined value and to decrease said refrigeration when said speed exceeds said value, a device responsive to a predetermined excess of said speed, and means controlled by said device to reduce the heat supplied to said gas.

8. A power system, comprising a gas turbine; means in series therewith to supply working gas thereto including means to cool said gas, means to compress said cooled gas, means to heat said compressed gas initially with rejected heat from said turbine and a combustion means further to heat said gas; means responsive to the speed of said turbine to control the cooling of said gas to maintain said speed substantially constant, a device responsive to a predetermined excess of speed of said turbine, and means controlled by said device to interrupt the functioning of said working gas supply means when said predetermined excess of speed is reached.

9. A closed operating cycle for thermal power systems, comprising the steps of refrigerating a working gas, compressing said gas, heating said compressed gas, obtaining useful work from said heated compressed gas, utilizing at least a portion of the heat rejected after obtaining said work to refrigerate said gas, and controlling said refrigeration proportionately to a function of said useful work whereby the power of said system is regulated by the degree of said refrigeration.

10. A closed operating cycle for thermal power systems, comprising the steps of refrigerating a working gas, compressing said gas, heating said compressed gas, obtaining useful work from said heated compressed gas, utilizing at least a portion of the heat rejected after obtaining said work to refrigerate said gas, controlling said refrigeration proportionately to a function of said useful work whereby the power of said system is regulated by the degree of said refrigeration and changing said closed cycle to an open cycle under certain predetermined undesired operating conditions.

11. An operating cycle for thermal power systems, comprising the steps of refrigerating a working gas, compressing said gas, heating said compressed gas, obtaining useful work from said heated compressed gas, utilizing at least a portion of the heat rejected after obtaining said work to refrigerate said gas, and controlling said refrigeration proportionately to a function of said useful work whereby the power of said system is regulated by the degree of said refrigeration.

12. An operating cycle for thermal power systems, comprising the steps of refrigerating a working gas, compressing said gas, heating said compressed gas, obtaining useful work from said heated compressed gas, utilizing at least a portion of the heat rejected after obtaining said work to refrigerate said gas, controlling said refrigeration proportionately to a function of said useful work whereby the power of said system is regulated by the degree of said refrigeration and changing the quantity of working gas supplied under certain predetermined undesired operating conditions.

13. In a cycle for operating a prime mover driven by hot working gas that is compressed before heating and is refrigerated before compression, the step of regulating the speed of said prime mover by increasing the degree of refrigeration of said gas when said speed decreases from a desired value, and decreasing said refrigeration when said speed increases above said desired value.

14. A power system, comprising a gas turbine, means to compress working gas therefor, means to heat said gas after compression, means to refrigerate said gas before compression, and means responsive to the speed of said turbine to increase said refrigeration when the speed of said turbine drops below a predetermined value and to decrease said refrigeration when said speed exceeds said value.

FRIEDRICH NETTEL.